March 31, 1953  L. S. WILLIAMS  2,633,349
AUTOMATIC WEIGHING SCALE
Filed Sept. 27, 1946  6 Sheets-Sheet 2
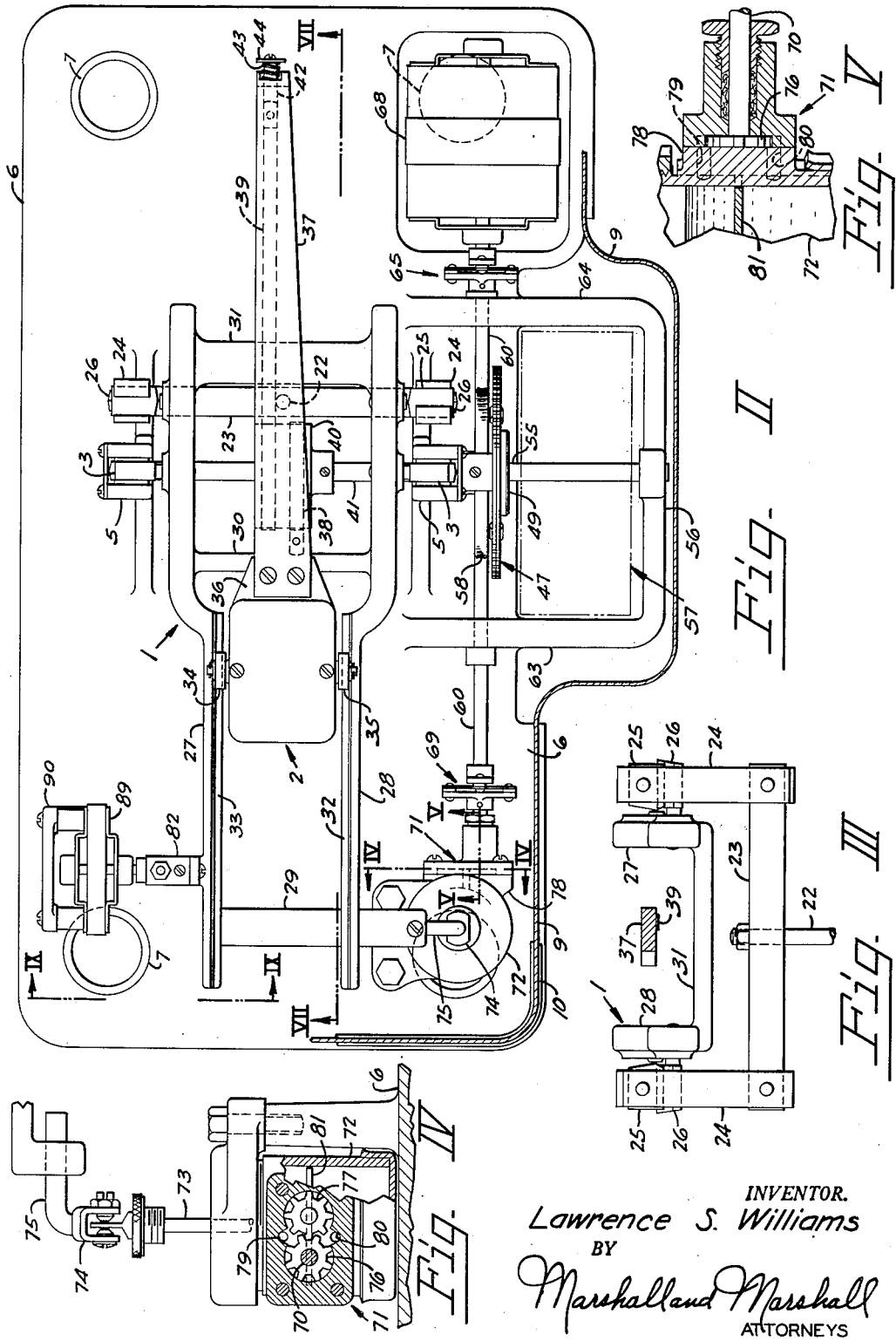
INVENTOR.
Lawrence S. Williams
BY
Marshall and Marshall
ATTORNEYS

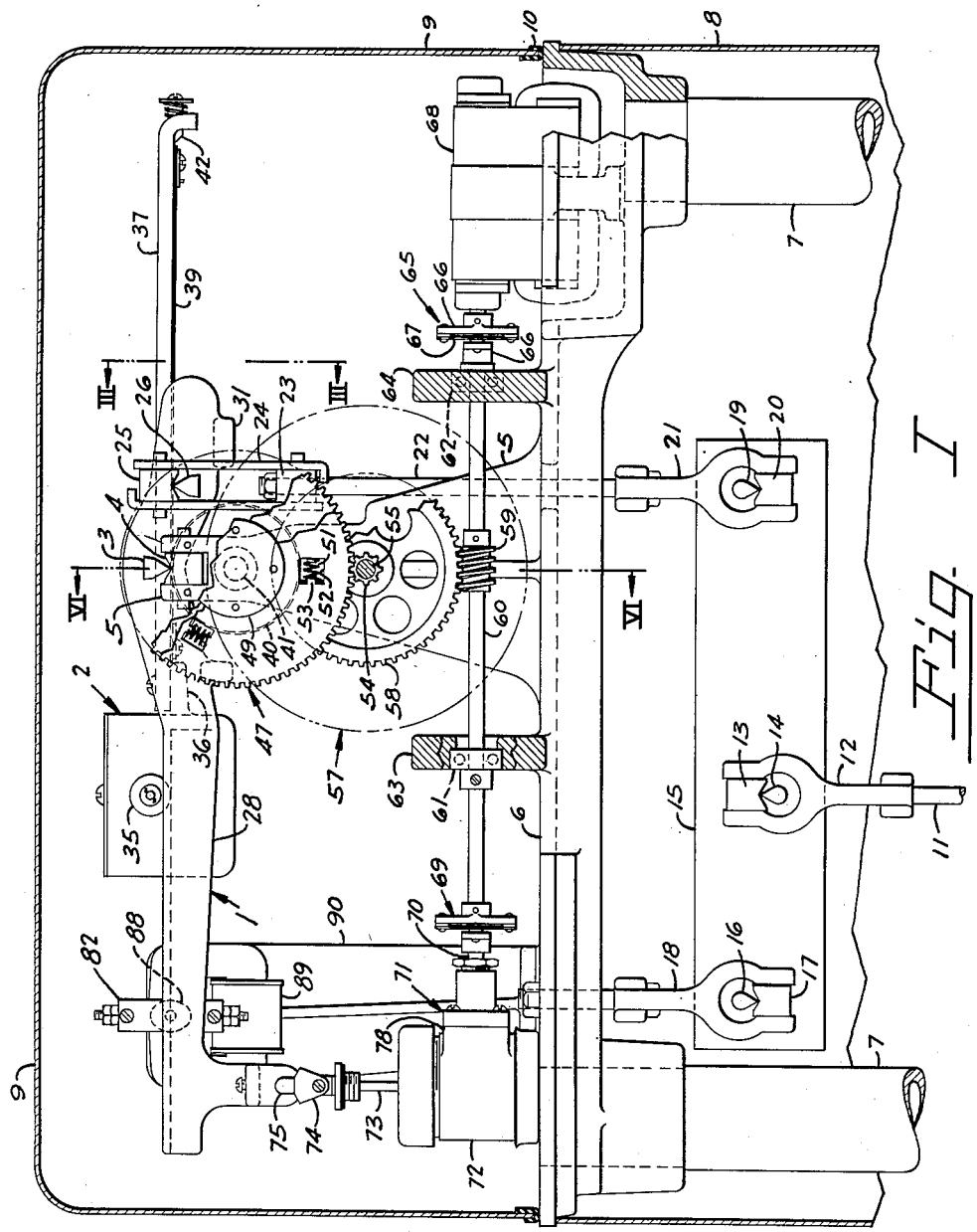

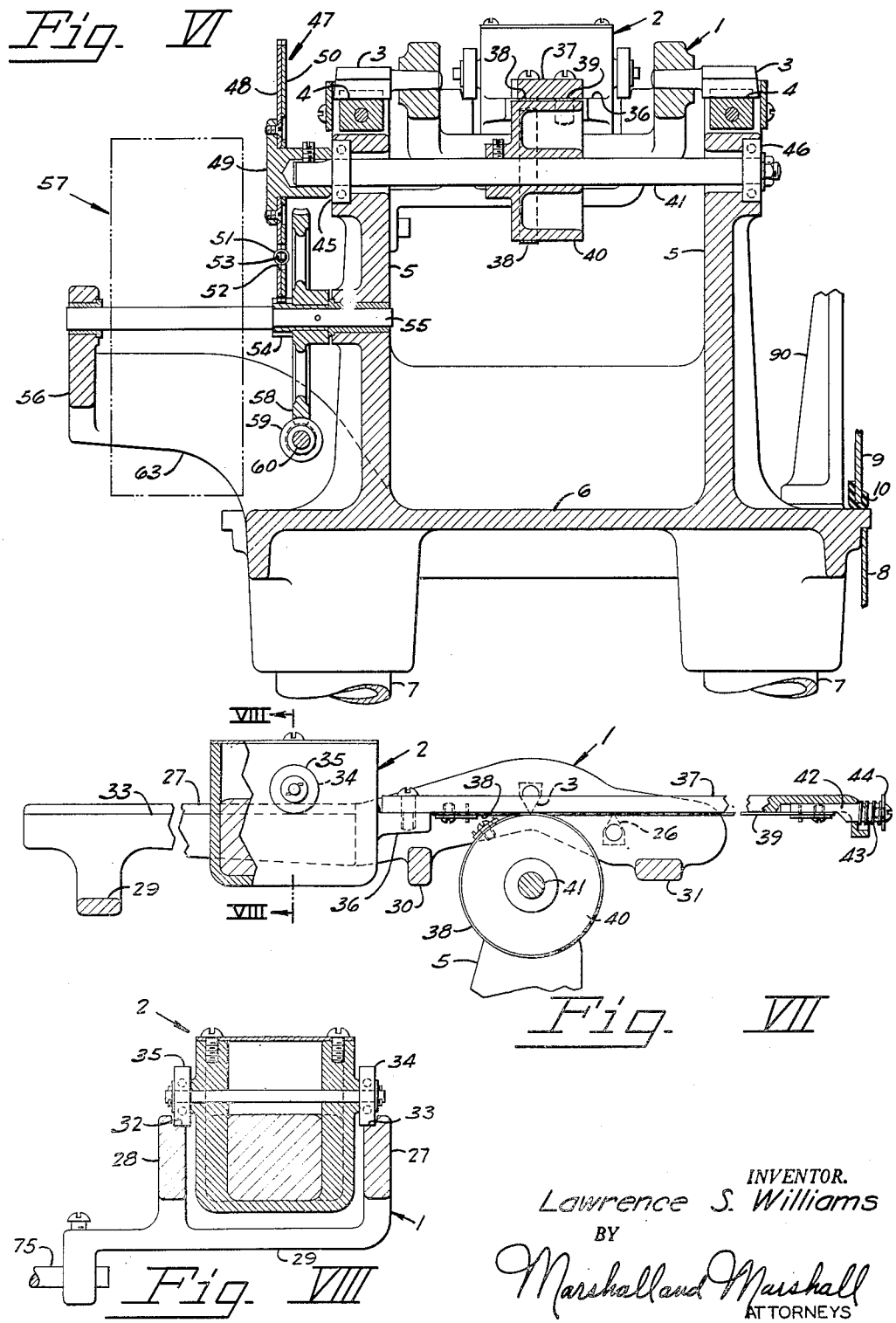

March 31, 1953 L. S. WILLIAMS 2,633,349
AUTOMATIC WEIGHING SCALE
Filed Sept. 27, 1946 6 Sheets-Sheet 4
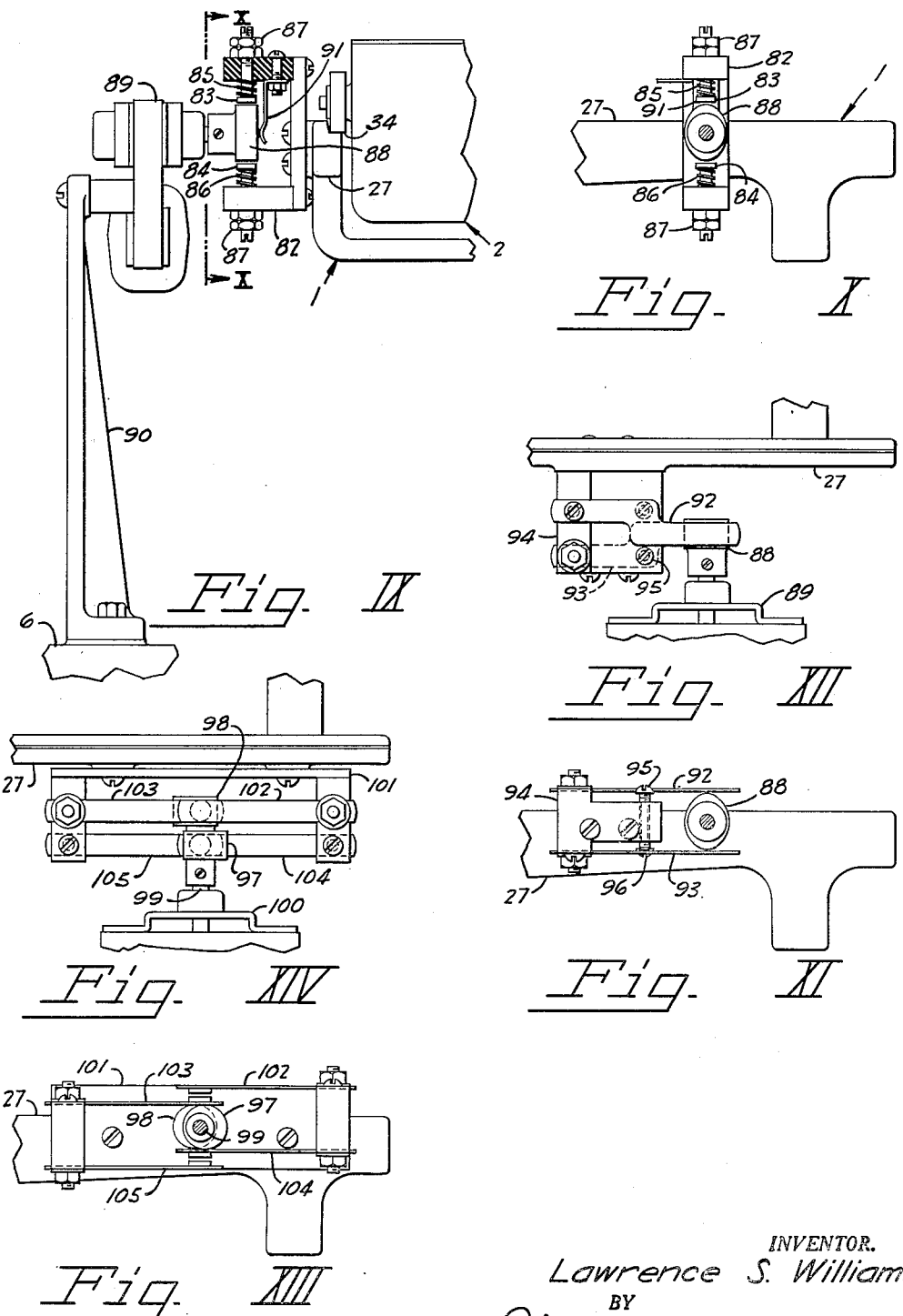
INVENTOR.
Lawrence S. Williams
BY
Marshall and Marshall
ATTORNEYS

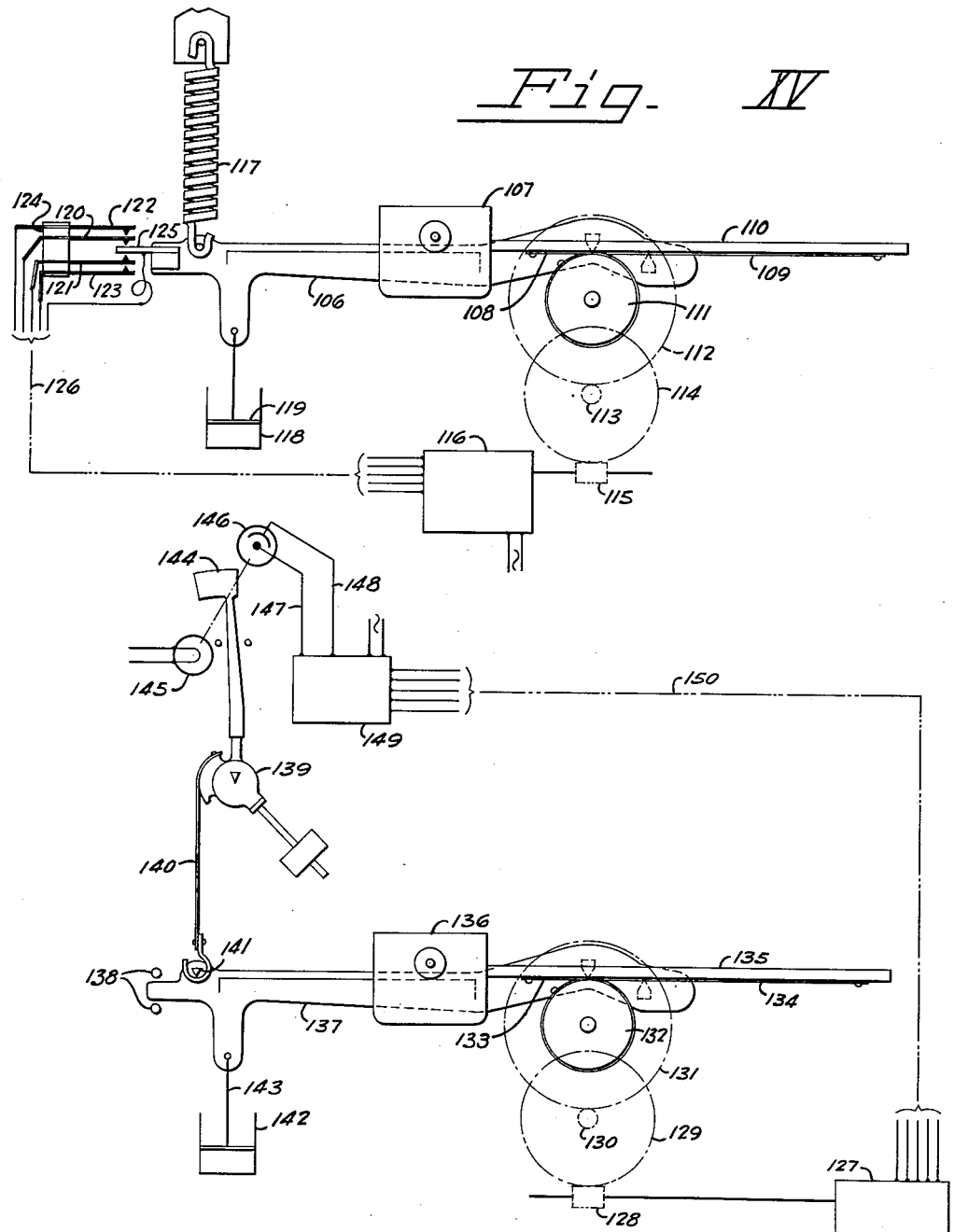

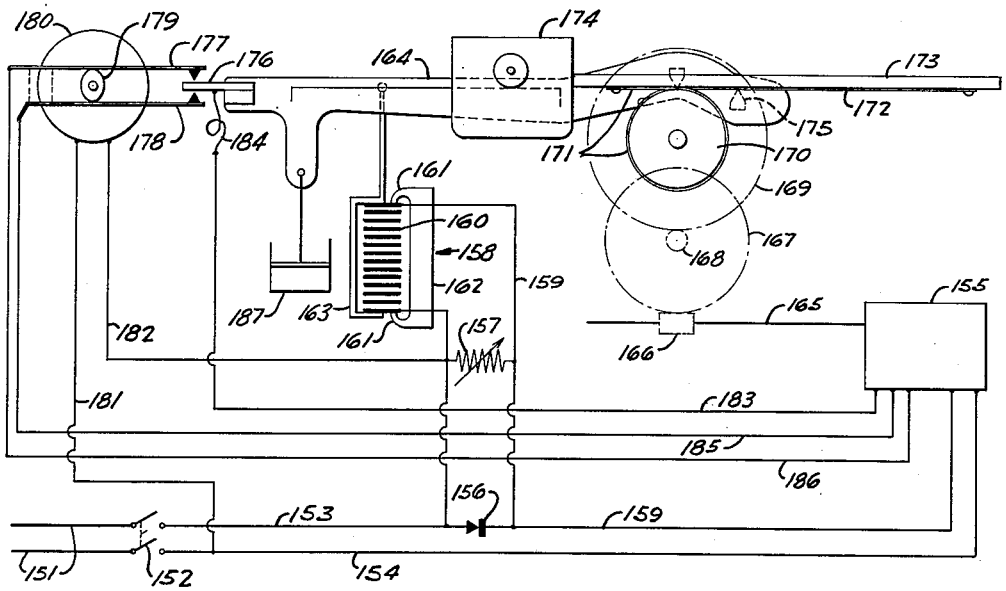
Fig. XVII

Patented Mar. 31, 1953

2,633,349

UNITED STATES PATENT OFFICE 2,633,349

AUTOMATIC WEIGHING SCALE

Lawrence S. Williams, Toledo, Ohio, assignor to Toledo Scale Company, Toledo, Ohio, a corporation of New Jersey Application September 27, 1946, Serial No. 699,775

7 Claims. (Cl. 265—56)

This invention relates to weighing scales having motor driven poises and more particularly to such a weighing scale in which an auxiliary mechanism controls the action of the weighbeam and the motor.

Many unsuccessful attempts to build motor driven poise weighing scales have been made. Most of these attempts were unsuccessful because the resulting scale was either unstable, i. e. it would not reach and maintain an accurate balance, or its speed of operation was too slow to be acceptable commercially. The desired characteristics of high speed operation and high accuracy are not readily obtained in the same structure. If the lever or weighbeam along which the poise is driven is adjusted for little or no pendularity, the condition required to produce a highly sensitive scale, the weighbeam does not respond to poise movement until the poise is at or past its load counterbalancing position. Yet, it is the condition of balance of the weighbeam that must be used to control the motor that drives the poise. As a result of these effects it has been necessary, to secure stabiilty, to slow up the motor to an extent such that the weighbeam may react to the minimum allowable unbalance before the poise is driven substantially beyond the balance point.

The principal object of this invention is to provide a weighing scale having a motor driven poise with auxiliary mechanism that governs the movements of the weighbeam or lever and the poise toward their respective load counterbalancing positions according to the displacement of the poise from its load counterbalancing position.

Another object of the invention is to provide an automatic weighing scale in which the load is initially counterbalanced by an automatic counterbalance and the counterbalancing function is subsequently assumed by a poise that is driven along a lever by a motor controlled by the automatic counterbalance.

A still further object of the invention is to provide an auxiliary counterbalance in the form of an oscillating spring that intermittently contacts the lever to provide force impulses tending to drive the lever towards its equilibrium position and that simultaneously transmits power impulses to the motor to effect corresponding changes in poise position.

The invention consists of a weighing scale having a motor driven poise and auxiliary mechanism for determining the unbalance between a load and the counterbalancing effect of the motor driven poise and for governing the movement of the lever and the poise toward their respective load counterbalancing positions.

The auxiliary mechanism in the improved weighing scale may include as the governing element a pendulum or a spring and preferably is operatively connected to the free end of the weighbeam. It is not necessary that the auxiliary mechanism or counterbalance have sufficient capacity to counterbalance the maximum load that may be applied to the scale, but it should have sufficient capacity to counterbalance an appreciable or substantial fraction of the load. Its function is two-fold. First, it serves to govern the movement of the weighbeam toward load counterbalancing position as the poise approaches the position at which it exactly counterbalances the applied load. Second, it provides an indication or signal that may be used to control the motor that drives the poise along the lever. The speed of response of the auxiliary counterbalance must be greater than the speed with which the poise driving motor changes the counterbalancing effect of the poise. This last condition is similar to an automatic packaging scale in which material is fed to a container on the scale and the rate of flow of the material and its cutoff is controlled by the scale. In the packaging scale it is readily apparent that the scale must be able to weigh the quantity of material in the package faster than the material is being added because, otherwise the scale would be unable to stop the flow of material at the proper time. Likewise, in the motor driven poise weighing scale the auxiliary counterbalance must be able to detect and determine the amount of unbalance as the poise approaches equilibrium with the load before such equilibrium is actually attained.

In the perferred form of the invention the motor is controlled in a more or less stepless fashion according to the degree of unbalance existing between the load and the counterbalancing effect of the poise. In suggested alternative forms of the invention a two-speed reversible motor is employed to drive the poise, the two speeds corresponding to the fast and dribble speeds of an ordinary packaging scale. In all forms of the invention the auxiliary mechanism or counterbalance controls the movement of the weighbeam toward its load counterbalancing position as the poise approaches a condition of equilibrium with the applied load.

As was mentioned previously, the automatic counterbalance need not have sufficient capacity to counterbalance the maximum load that may be applied because stops may be supplied to limit the travel of the weighbeam. The counterbalancing effect of the auxiliary counterbalance must, however, be sufficiently great and sufficiently rapid that it may assume control of the beam in time to stop the poise before it passes its correct load counterbalancing position.

Specific examples of automatic weighing scales illustrating the preferred and alternative forms of the invention are illustrated in the accompanying drawings.

In the drawings:

Figure I is a vertical elevation, partly in section, of a motor driven load counterbalancing mechanism.

Figure II is a plan view of the load counterbalancing mechanism.

Figure III is a transverse section taken substantially along the line III—III of Figure I.

Figure IV is a fragmentary vertical section taken along the line IV—IV of Figure II.

Figure V is a fragmentary vertical section taken substantially along the line V—V of Figure II.

Figure VI is a vertical transverse section taken along the line VI—VI of Figure I.

Figure VII is an elevation, partly in section, of the poise and lever taken substantially along the line VII—VII of Figure II.

Figure VIII is a fragmentary vertical section of the poise taken along the line VIII—VIII of Figure VII.

Figure IX is a fragmentary end elevation of the auxiliary counterbalance taken susbtantially along the line IX—IX of Figure II.

Figure X is a fragmentary elevation taken along the line X—X of Figure IX.

Figure XI is a fragmentary elevation of a mechanical equivalent of the structure shown in Figure X.

Figure XII is a fragmentary plan view of the structure shown in Figure XI.

Figure XIII is another modification that may be substituted for the structure in Figure X.

Figure XIV is a fragmentary plan of the structure shown in Figure XIII.

Figure XV is a schematic illustration of another example of an auxiliary counterbalance applied to a motor driven poise weighing scale.

Figure XVI schematically illustrates a motor driven poise weighing scale employing a pendulum as the automatic counterbalance.

Figure XVII is a schematic diagram of a motor control circuit suitable for use in the improved weighing scale.

These specific figures and the accompanying description are intended merely to illustrate the invention and not to impose limitations on the claims.

In the preferred form of the invention a weighing lever 1 carrying a poise 2 is pivotally mounted with its fulcrum pivots 3 resting on V-bearings 4 that are mounted in the upper ends of fulcrum stands 5 erected from a beam shelf or deck 6. The deck 6 is, in turn, supported on tubular standards 7 erected from the base of the scale. A sheet metal housing 8 encloses the weighing mechanism located beneath the deck 6 while a sheet metal cover 9 fitted with a rubber moulding 10 around its edge encloses that portion of the weighing mechanism located above the deck 6.

Load forces from a load receiver, not shown, are transmitted through a steelyard rod 11 suspended from a stirrup 12 whose V-bearings 13 rest on a load pivot 14 of a bench lever 15. Fulcrum pivots 16 of the bench lever 15 are carried on V-bearings 17 of a stirrup 18 that depends from the deck 6. A power pivot 19 of the bench lever 15 acts against V-bearings 20 of a stirrup 21 that is suspended from a steelyard rod 22 whose upper end is supported by a transverse bar 23 (see also Figure III). The bar 23, in turn, is suspended by means of links 24 from V-bearings 25 that rest on load pivots 26 of the weighing lever 1.

The weighing lever 1 is a grid-like framework having spaced apart generally parallel side rails 27 and 28 that are held in spaced relation by a plurality of integrally formed U-shaped cross ties 29, 30 and 31. The parallel rails 27 and 28 are milled along their upper surface to provide tracks 32 and 33 for the outer races of ball bearings 34 and 35 (Figures II and VIII) serving as wheels for the poise 2. The side rails 27 and 28, which are comparatively thin in their vertical direction, are bent upwardly in the vicinity of the fulcrum to provide adequate support for the fulcrum pivots 3 and are bent downwardly to receive the shanks of the load pivots 26. This configuration places the path of the poise and the pivot line determined by the pivots 3 and 26 in parallel relation as is required to produce a uniformly sensitive weighing scale.

The poise 2, Figure VII, is a generally rectangular cup-shaped body having on one side a lug 36 to which is attached a long slender boom 37 that extends beyond the fulcrum axis of the weighing lever 1 a distance that is greater than the length of the tracks 32 and 33 cut in the side rails 27 and 28. A pair of steel ribbons 38 and 39, one attached near the poise end of the boom and the other attached at the opposite end of the boom, are wrapped in opposite directions around and are secured to a drum 40 that is carried on a shaft 41 whose axis is parallel to and directly beneath the fulcrum axis of the weighing lever 1 with the periphery of the drum 40 substantially tangent to the pivot line of the lever. To maintain a uniform tension in the steel ribbons 38 and 39 the end of the ribbon 39 is not connected directly to the end of the boom 37, but rather is connected to a member 42 slidably mounted in the end of the boom. A coil spring 43 held compressed between the end of the boom and a washer 44 attached to the slidable member 42 urges the member 42 in a direction to stretch the ribbon 39.

Since the ribbons 38 and 39 pass through the fulcrum axis of the lever 1 they can transmit force to move the poise 2 without in themselves exerting any moment on the lever. Likewise, the torque required to bend one of the ribbons 38 and 39 to the curvature of the drum 40 is counterbalanced by an equivalent torque exerted by the other ribbon as it unwinds from the drum. The net result of the bending forces of the two ribbons is thus a vertical force acting through the fulcrum axis of the lever and, therefore, exerting no moment.

The shaft 41 carrying the tape driving drum 40 is journaled in ball bearings 45 and 46 mounted in the fulcrum pedestals 5 immediately beneath the V-bearings 4. The forward end of the shaft 41, the left end as seen in Figure VI, is provided with an anti-backlash spur gear 47 having a first section 48 rigidly secured to a hub 49 mounted on the shaft 41 and a second section 50 positioned closely adjacent the fixed section 48 but free to turn on the hub 49. A plurality of coil springs 51 are held compressed within the openings of registering windows 52 cut in the gear sections 48 and 50 and held positioned therein by projecting lugs 53. The ends of the windows 52 are not in exact registry when the gear teeth are accurately aligned so that the teeth of the two sections of the gear 47 tend to pinch the teeth of the mating gear and thus prevent any backlash between the gears. The gear 47 meshes with and is driven by a pinion 54 mounted on an intermediate shaft 55. One end of the shaft 55 is journaled in one of the fulcrum stands 5, while the other end of the shaft 55 is journaled in a bracket 56 extending forwardly and upwardly from the deck 6. The shaft 55 whose rotation corresponds precisely to the position of the poise 2 along the lever 1 drives a counter 57 that serves to indicate and, if desired, to record the weight of the load being counterbalanced by the poise.

The shaft 55 also carries and is rotated by a worm wheel 58 that meshes with a worm 59 mounted on a shaft 60 journaled in ball bearings 61 and 62 mounted in supports 63 and 64 erected from the deck 6. The bearings 61 and 62 may be of the radial thrust variety so that the shaft 60 is firmly held against axial movement. One end of the shaft 60 is connected through a flexible coupling 65 comprising a pair of yokes 66 and a flexible diaphragm 67 to an electrical motor 68 of a variety whose speed and torque may be controlled by controlling the power input to the motor.

The other end of the shaft 60 (Figure I) is connected through a flexible coupling 69 to an input shaft 70 of an oil pump 71 that is mounted on the side of a dashpot 72. The dashpot 72 is conventional except for the oil pump 71 and has a plunger rod 73 that is pivotally connected by a ball and socket joint 74 to an arm 75 extending from one side of the weighing lever 1. The oil pump 71 (Figures IV and V) comprises a pair of gears 76 and 77, one of which is driven by the input shaft 70, rotating in overlapping counterbores cut into the body of the pump 71. A boss 78 extending from the side of the dashpot 72 is machined flat and serves as one side of the gear pump housing. Inlet and outlet passages 79 and 80 open from the gear pump into the interior of the dashpot 72 above and beneath its piston 81 which is carried on the plunger rod 73. The oil pump 71 is driven by the motor 68 in a direction such that it tends to counterbalance part of the load applied to the weighing mechanism. It thus serves to apply a force to the lever which is a function of the velocity of the poise. Since the pump is direct connected to the motor it responds to every movement of the motor and thus immediately applies corrective force to the lever regardless of any backlash or inaccuracy in the gear connection between the motor and the poise.

An insulating bracket 82 (Figure IX) attached to one side of the rail 27 of the lever 1 near its free end carries a pair of contacts 83 and 84 that are slidably mounted in the bracket 82 and are urged toward each other by compression springs 85 and 86. Nuts 87 threaded on the stems of the contacts 83 and 84 limit the inward travel of the contacts. An elliptical cam 88 carried on the shaft of a motor 89 mounted on a standard 90 erected from the deck 6 is interposed between the contacts 83 and 84. The adjustment of the contacts is such that the high points of the cam just touch the contacts when the lever 1 is in its neutral position. The contacts are connected in the circuit to the motor 68 so that the motor 68 is energized as long as either contact is closed. If the upper contact 83 is closed a circuit is completed through the contact 83, the cam 88 and a brush 91 riding on the cam to energize the motor 68 so that it drives the poise toward the fulcrum of the weighing lever 1. If, on the other hand, the lever 1 rises so that the contact 84 touches the cam, power flows through the contact 84, cam 88 and the brush 91 so that the motor drives the poise away from the fulcrum. If the lever 1 is in its neutral position the cam 88 touches the contacts 83 and 84 during short but equal time intervals so that the motor does not tend to turn. As soon as the lever 1 rises or falls the duration of contact between the cam 88 and one of the contacts 83 or 84 is increased and the other is decreased so that a net driving current is supplied to the motor. Because of the eccentricity of the cam 88, the duration of contact between the cam and the contact points varies according to the position of the lever.

In addition to controlling the amount of current transmitted to the motor the contact between the cam 88 and the contact points 83 or 84 delivers short force impulses to the lever tending to drive it toward its neutral position. The spring effect of the contacts thus functions as an auxiliary counterbalance tending to restore the lever to its neutral position as well as regulate the flow of current to the driving motor.

The friction of the stems of the contacts 83 and 84 sliding in the arms of the insulating bracket 82 may be objectionable in some applications. In this event leaf spring contacts 92 and 93 (Figures XI and XII) that are mounted on an insulating bracket 94 attached to the rail 27 and that cooperate with the cam 88 may be substituted for the sliding contacts 83 and 84. Adjusting screws 95 and 96 threaded through the insulating bracket 94 serve to regulate the duration of contact between the leaf springs and the cam when the lever 1 is in its neutral position.

If the sliding contact between the cam 88 and the spring leaf contacts 92 and 93 is objectionable as a current conductor additional leaf contacts may be employed. Thus, in Figure XIII, two circular eccentric cams 97 and 98 are shown mounted on a shaft 99 that is rotated by a motor 100. An insulating bracket 101 attached to the rail 27 of the lever 1 carries an upper set of spring contacts 102 and 103 that are oscillated into intermittent contact by the eccentric 98. A similar set of leaf contacts 104, 105 are located beneath the motor shaft 99 and are oscillated by the eccentric 97. As in the preceding examples, the contacts are intermittently opened and closed and the duration of time that either contact is closed is a function of displacement of the lever 1 from its neutral position.

The feature of oscillating the contacts, in addition to supplying a force tending to govern the movement of the lever 1 toward its load counterbalancing position, permits the current to the motor to be controlled or regulated according to the distance that the poise must travel to reach its load counterbalancing position. Oscillating the contacts provides another feature in that a very small net restoring force may be applied to the lever while still maintaining firm pressure between the contacts when they are carrying current. This last feature overcomes the trouble encountered when attempting to carry appreciable currents between members that are lightly held in contact. It also insures that sufficient pressure is exerted to establish electrical contact even though small particles of dirt or other foreign material may have found their way onto the contact surfaces.

The oscillating contacts supply the major part of the force governing the movement of the lever toward its load counterbalancing position, while the flow of oil from the pump 71 through the dashpot 72 provides additional force urging the beam towards its load counterbalancing position. The pump 71 or even the dashpot 72 may be eliminated and the entire governing action delegated to the oscillating springs with little loss in performance.

Electrical motors that are suitable for this method of control include the split field universal type, shaded pole motors with wound shading coils, repulsion motors having two sets of brushes for determining direction of rotation as well as many others. For optimum control when energizing the motors with alternating current it is necessary that the oscillating contacts not only be synchronous with but also be phased with the alternating current source. Such phasing may be accomplished, for example, by driving the cam 88 with a polarized synchronous motor. If shaded pole motors employing wound shading coils are used for the poise driving motor the field of the motor may be continuously energized while the shading coils are connected to the oscillating contacts. Repulsion motors may be employed in much the same manner, i. e. the contacts are connected to close the armature circuits by short circuiting one or the other set of brushes.

Figure XV illustrates an alternative form of motor driven poise weighing scale employing an auxiliary counterbalance for controlling the poise driving motor. In this example a weighing lever 106 carries a poise 107 that is driven along the lever by steel ribbons 108, 109 connected to a boom 110 extending from the poise 107. The tapes 108 and 109 are wound around and are attached to a drum 111 which through a train of gears, 112, 113, 114 and a worm 115 is connected to and driven by a motor 16. The lever 106 is connected to and partially supported by an auxiliary counterbalance in the form of a spring 117. A dashpot 118 has its plunger 119 connected to the lever 106 to control the action of the auxiliary counterbalance 117 so that it acts as a well-damped automatic scale.

A pair of low speed contacts 120 and 121 and a pair of high speed contacts 122 and 123 are mounted in an insulating bracket 124 in a position such that they may be engaged and operated by a contact finger 125 attached to the lever 106. The contacts are connected through a cable 126 to the motor 116. The motor 116 is of a two-speed variety having a low and a high speed in either forward or reverse directions. If the load on the scale is increased the lever 106 moves up bringing the contact finger 125 against the contact 120, thus energizing the motor 116 for a slow forward speed to drive the poise 107 away from the fulcrum of the lever 106. If the amount of unbalance is sufficiently great the contact 120 is deflected upwardly against the high speed contact 122 so that the motor 116 is energized for high speed operation. The partial unloading of the auxiliary counterforce spring 117 produces the effect of a downwardly applied force which with the force from the leaf contact 120 causes the lever 106 to return toward its neutral position thus breaking the high speed contact 122 slightly before the poise reaches its equilibrium position. Since the contact 120 is set close to the neutral position of the lever 106 it will continue to energize the motor 116 for slow speed operation until the poise reaches its position of equilibrium. If, on the other hand the load is removed from the scale the lever 106 drops to extend the counterbalancing spring 117 and close the contacts 121 and 123 to operate the motor in the reverse direction. Again the motor is thrown into low speed operation shortly before the poise reaches its equilibrium position.

The control of the poise in this example is very much like the control of the flow of material in an automatic packaging scale. The velocity of the poise, like the flow of material, is greatest when a considerable unbalance exists and is reduced shortly before the poise reaches its equilibrium position and is cut off entirely when final equilibrium is reached. The same sequence of operation occurs as in a packaging scale and like a packaging scale the ultimate speed of operation with stability is determined by the time required for the automatic counterbalance to reach equilibrium with the unbalance that it must weigh.

Another example of an automatic counterbalance acting to return a poise carrying lever to a neutral position as the poise approaches equilibrium is illustrated in Figure XVI. In this example a motor 127 driving through a worm 128, worm wheel 129, pinion 130 and spur gear 131 rotates a drum 132 to which steel ribbons 133 and 134 are attached. The other ends of the ribbons 133 and 134 are connected to a boom 135 extending horizontally from a poise 136 that is driven along a lever 137 by rotation of the drum 132. Stops 138 limit the upward or downward travel of the lever 137. An auxiliary automatic counterbalance in the form of a pendulum 139 is connected through a tape 140 to a knife edge 141 located in the end of the lever. A dashpot 142 connected through a plunger rod 143 to the lever 137 serves to regulate the action of the auxiliary counterbalancing pendulum 139. A vane 144 carried by the pendulum 139 is positioned in the light path from a light source 145 to a photocell 146 and intercepts more or less of the light according to the position of the lever 137 and the pendulum 139. The photocell 146 is connected through leads 147, 148 to an amplifier and relay control 149 that is connected through a cable 150 to the motor 127. The motor 127 and the relays are assembled so that when the lever is up and the photocell is dark the motor 127 is energized for full speed forward so that the poise is driven rapidly toward its position of equilibrium. As equilibrium is approached the pendulum 139 pulls the lever toward its neutral position and simultaneously admits some light to the photocell 146. When a certain light intensity is reached the high speed control is deenergized allowing the motor to operate at low speed until some higher light intensity on the photocell is reached. At this point the motor is stopped and the load on the scale is substantially counterbalanced by the poise so that the poise position is an accurate indication of the magnitude of the load. If the load should decrease still more light is admitted to the photocell which then energizes the relays to operate the motor in low speed reverse. Finally, if the unbalance resulting from the decrease in load is great enough the light beam is entirely unobstructed and the relays call for high speed reverse to quickly return the poise toward its zero position. As balance is approached the pendulum 139 pulls the lever toward its neutral position and the vane 144 intercepts some of the light to the photocell to slow up the motor and finally stop it.

A motor control circuit that provides high and low speed operation in either forward or reverse, is illustrated in Figure XVII. This motor control is suitable for use with any of the above examples, but more particularly for use with the first example employing vibrating contacts that urge the lever toward its neutral position at the same time that they regulate the flow of current to the motor.

This particular motor control circuit employs a shaded pole motor whose field is energized by an electrical current having varying proportions of alternating and direct components and that has a wound shading coil for each direction of rotation, which shading coils are connected to vibrating contacts so that the contacts control the direction of rotation and the power output of the motor. Referring to Figure XVII, alternating current is supplied through leads 151 connected to a source of power and is transmitted through a disconnect switch 152 to leads 153 and 154. The lead 154 is connected directly to the field of a shaded pole motor 155 while the lead 153 is connected through a parallel combination of a half wave rectifier 156, an adjustable resistor 157 and a pressure sensitive resistor 158 to a lead 159 that is connected to the field of the motor 155. The pressure sensitive resistor 158 consists of a stack of carbon disks 160 held between arms 161 of a generally C-shaped insulating bracket 162. Another insulating bracket 163 also engaging the ends of the stack of carbon disks 160 is pivotally connected to a lever 164 of a load counterbalancing mechanism. When the lever is balanced the stack of carbon disks 160 are substantially free from pressure so that they present a high resistance to the flow of current. When the lever is unbalanced in either direction, the stack of carbon disks 160 is compressed between one of the arms 161 and the other end of the lever supported bracket 163, the compression serving to decrease the resistance of the stack thereby permitting greater current flow to the motor 155.

The effect on the motor 155 of the parallel combination of the half wave rectifier 156, the adjustable resistor 157, and the pressure sensitive resistor 158 is to cause the motor to tend to operate at high speed when pressure is applied to the carbon stack 160 and to operate at slow speed when pressure is removed from the carbon stack. This result occurs because the half wave rectifier 156 blocks off half of the alternating current tending to flow through the motor such that the resulting current has a direct component and an alternating component. The direct component causes the motor to act as an induction brake while the alternating component causes it to act as an alternating current motor. When the resistance of the carbon stack 160 and the adjustable resistance 157 is high, a large proportion of direct current flows through the motor so that it tends to operate at a slow speed determined by the balance between the braking effect of the direct current and the driving effect of the alternating current. When pressure is applied to the carbon stack 160, thereby decreasing its resistance, alternating current is by-passed around the rectifier 156 thereby increasing the driving effort of the motor and decreasing the induction brake effect so that the motor operates at a higher speed.

The armature of the motor is connected through a rotor shaft 165 to a worm 166 that drives a worm wheel 167. The worm wheel 167, through a pinion 168 and a spur gear 169, drives a drum 170 to which is attached a pair of steel tapes 171 and 172 whose other ends are attached to a boom 173 extending from a poise 174. The poise 174 is thus driven along the lever 164 by rotation of the motor 155.

The unbalance between a load applied to a load pivot 175 of the lever 164 and the counterbalancing moment of the poise 174, causes the lever 164 to rock upwardly or downwardly and thus either bring into contact or alter the duration of contact between a contact finger 176 extending from the tip of the lever and a pair of vibrated leaf spring contacts 177 or 178. The contacts are oscillated toward and away from each other by an elliptical cam 179 that is rotated by a synchronous motor 180 of a type that also maintains the same phase relation with the driving voltage. The motor 180 is connected through leads 181 and 182 to the alternating current supply leads 154 and 153, respectively. The poise driving motor 155 has shading coils that are connected in series with the common connection between the coils brought out to a lead 183 that is connected through a flexible connection 184 to the contact finger 176. The other ends of the shading coil windings are connected through leads 185 and 186 to the leaf spring contacts 177 and 178, respectively. When the lever 164 is in its neutral position the contacts 177 and 178 either do not contact the finger 176 or they contact the finger 176 for equal increments of time. In the event that they do not contact the finger, no current can flow in the shading coils of the motor 155, and consequently the motor can develop no torque. If the contacts 177 and 178 contact the finger 176 for equal increments of time, current flows in both shading coils with the result that no torque is developed.

If the load is changed so that an unbalance between the load moment and the counterbalancing moment of the poise 174 exists, the lever 164 is deflected upwardly or downwardly and one of the contacts 177 or 178 then contacts the finger 176 for greater lengths of time than the other of the contacts. This difference in duration of contact unbalances the current flow in the shading coils or entirely cuts out the flow of current in one of the shading coils so that the motor develops torque to drive the poise toward its load counterbalancing position. The rate at which the motor moves the poise is determined by the duration of the contact between the finger 176 and one of the contacts 177 or 178, and the pressure applied to the carbon stack 160. The amplitude of vibration of the contacts 177 and 178 and the resiliency of the carbon stack 160 is adjusted so that under conditions of large unbalance one of the contacts rests continuously against the contact finger 176 and the motor is energized for high speed operation.

The strength of the spring leaf contacts 177 and 178 and a dashpot 187 are selected so that the force impulses imparted to the lever by the spring leaf contacts are, for small unbalances, substantially equal to the change in counterbalancing moment effected by the movement of the poise 174 in response to the power impulses transmitted to the motor 155.

This coordination of the strength of the springs, the dashpot and the driving and braking effect of the current supplied to the motor 155, produces a motor driven poise scale that is rapid in operation and which does not hunt about the balance point.

Substantially the same motor control may be used in connection with the weighing scales illustrated in Figures XV and XVI. To adapt the circuit for these scales the low speed contacts of Figures XV and XVI are connected in the shading coil circuits, while the high speed contacts are arranged to by-pass the half wave rectifier 156. Inasmuch as full braking torque is applied to the motor as long as the rectifier 156 is controlling the flow of current to the field of the motor 155, the motor stops without appreciable overrun the instant that the shading coil circuits are opened. This motor control thus provides both high speed operation and controlled low speed operation as is necessary for satisfactory operation of a motor driven poise weighing scale.

In each of these examples the operation of the weighing scale will be stable as long as the auxiliary counterbalancing mechanism can react to and indicate a change in the condition of balance before the motor can drive the poise through a distance that changes the condition of balance in an amount greater than the unbalance that initiated the rebalancing action. In the first example, the preferred form of the invention, where the force counterbalancing effect of the auxiliary counterbalance is applied intermittently the scale will have its best stability and highest speed of response when the travel of the poise for each of the intermittent impulses is made equal to the counterbalancing effect of the intermittent force impulses. If the travel of the poise per impulse is less than this ideal amount, the poise approaches its equilibrium position by successively smaller steps that decrease in magnitude according to an exponential curve. If the travel of the poise per impulse is greater than twice the ideal amount the scale is unstable and will never come to rest because each correction throws an error into the balance which is opposite to and slightly greater than the unbalance that the correction was to eliminate. If the correction in poise position for each impulse is greater than the ideal amount, but less than twice that amount, the poise will be shifted back and forth from one side to the other to the true equilibrium point by successively smaller steps until it finally comes to rest at the true equilibrium point.

By selecting the best compromise between the strength of the intermittent impulses, their duration, and the travel of the poise per impulse, it is possible to construct a motor driven poise scale that is equal in speed and accuracy to conventional scales employing pendulum counterbalances.

Various modifications and changes in the specific structure disclosed and described may be made to adapt the improved motor driven poise scale to specific uses without departing from the spirit and scope of the invention.

Having described the invention, I claim:

1. In a weighing scale, in combination, a pivotally mounted lever, means for applying load forces to the lever, a poise movable along the lever for counterbalancing the load force, an independently driven oscillating resilient member for counterbalancing that portion of the load not counterbalanced by the poise, contacts actuated by the resilient member, and an electric motor for moving the poise, said motor being energized through the contacts in an amount generally proportional to the duration of contact between the oscillating resilient member and the lever.

2. In a weighing scale, in combination, a pivotally mounted lever to which load forces are pivotally applied, a poise movable along the lever for counterbalancing the load forces, a motor for moving the poise along the lever, and an independently driven oscillating resilient member that contacts the lever for applying counterbalancing force to the lever, the member applying intermittent force when the forces to be counterbalanced are small, said motor being controlled according to the duration of the intermittent contacts between the member and the lever.

3. In a weighing scale, in combination, a pivotally mounted lever to which load forces are pivotally applied, a poise movable along the lever for counterbalancing the load forces, a motor for drawing the poise along the lever, and an independently driven oscillating resilient member for applying counterbalancing force to the lever, the member applying intermittent force when the forces to be counterbalanced are small, said motor being controlled through the intermittent contact between the member and the lever to move the poise to change its counterbalancing effect in an amount substantially equal to the counterbalancing effect of the intermittent contact between the member and the lever.

4. In an automatic weighing mechanism, in combination, a pivotally mounted lever to which load forces are pivotally applied, a poise movable along the lever for counterbalancing the load forces, a dashpot connected to the lever, an oscillating resilient member that contacts the lever during increments of time that vary with the displacement of the lever from its neutral position, a motor for driving the poise along the lever, the motor being controlled through the intermittent contacting of the resilient member, and a pump driven by the motor for pumping fluid through the dashpot.

5. In an automatic weighing mechanism, in combination, a pivotally mounted lever to which load forces are pivotally applied, a poise movable along the lever for counterbalancing the load forces, an auxiliary load counterbalancing mechanism operatively connected to the lever for measuring the amount of unbalance existing between the load forces and the counterbalancing force of the poise, a motor operatively connected to the poise on the lever, said mechanism including cyclically operating electrical contacts that are closed during a time interval of each cycle that is proportional to the load counterbalanced by the mechanism for controlling current to the motor and adjusted so that for each unit of time the movement of the motor and poise effects a change in balance of said lever that is less than the force exerted by the auxiliary mechanism.

6. In an automatic weighing mechanism, in combination, a pivotally mounted lever to which load forces are pivotally applied, a poise movable along the lever for counterbalancing the load forces, a dashpot connected to the lever, a pump for pumping fluid through the dashpot, an electrical motor for driving the poise along the lever, the motor also driving the pump, and means for controlling the motor according to the deflection of the lever from its neutral position.

7. In an automatic weighing mechanism, in combination, a pivotally mounted lever to which load forces are pivotally applied, a poise movable along the lever for counterbalancing the load forces, a resilient member, electrical contacts on the lever that cooperate with the resilient member, means for oscillating the resilient member, a synchronous alternating current motor for driving said oscillating means to oscillate the resilient member such that it touches the lever contacts during increments of time that vary with the displacement of the lever from its neutral position, an alternating current motor for driving the poise along the lever, said poise driving motor being controlled through said electrical contacts whereby the response of the motor varies with the displacement of the lever.

LAWRENCE S. WILLIAMS.

REFERENCES CITED

The following references are of record in the file of this patent:

UNITED STATES PATENTS

| Number | Name | Date |
|---|---|---|
| 1,484,358 | Norton | Feb. 19, 1924 |
| 2,068,565 | Okey | Jan. 19, 1937 |
| 2,073,445 | De Iongh | Mar. 9, 1937 |
| 2,222,140 | De Iongh | Nov. 19, 1940 |

FOREIGN PATENTS

| Number | Country | Date |
|---|---|---|
| 456,978 | Great Britain | Nov. 17, 1936 |